(12) United States Patent
Sethi et al.

(10) Patent No.: US 12,737,031 B2
(45) Date of Patent: Sep. 15, 2026

(54) FRAMEWORK FOR MANAGING PSU MAXIMUM POWER CONSUMPTION THRESHOLD VIA MANAGEMENT CONTROLLER

(71) Applicant: Dell Products L.P., Round Rock, TX (US)

(72) Inventors: Parminder Singh Sethi, Punjab (IN); Pandiyarajan Mani, Gudiyattam (IN); Veena Ramarao, Bangalore (IN); Vinoth Raja P, Thiruvarur (IN)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 18/930,723

(22) Filed: Oct. 29, 2024

(65) Prior Publication Data

US 2026/0118942 A1 Apr. 30, 2026

(51) Int. Cl.

| | |
|---|---|
| ***G06F 1/00*** | (2006.01) |
| ***G06F 1/28*** | (2006.01) |
| ***G06F 1/3212*** | (2019.01) |
| ***G06F 1/324*** | (2019.01) |

(52) U.S. Cl.

CPC ................ *G06F 1/324* (2013.01); *G06F 1/28* (2013.01); *G06F 1/3212* (2013.01)

(58) Field of Classification Search

CPC ........... G06F 1/324; G06F 1/28; G06F 1/3212

See application file for complete search history.

(56) References Cited

U.S. PATENT DOCUMENTS

| | | | | |
|---|---|---|---|---|
| 10,871,818 | B1 * | 12/2020 | De La Cropte De Chanterac | G06F 1/325 |
| 12,438,387 | B2 * | 10/2025 | Wu | H02J 7/933 |
| 2003/0033547 | A1 * | 2/2003 | Larson | G06F 1/18 713/300 |
| 2015/0121104 | A1 * | 4/2015 | Kinouchi | G06F 1/3206 713/322 |
| 2018/0095520 | A1 * | 4/2018 | Rajwan | G06F 1/28 |
| 2020/0142465 | A1 * | 5/2020 | Jenne | G06F 1/3206 |
| 2021/0157387 | A1 * | 5/2021 | Debata | G06F 1/30 |
| 2022/0404885 | A1 * | 12/2022 | Kanjirathinkal | G06F 1/263 |
| 2024/0152191 | A1 * | 5/2024 | Luo | G06F 1/324 |
| 2026/0106858 | A1 * | 4/2026 | Myers | H04L 61/5053 |

* cited by examiner

*Primary Examiner* — Xuxing Chen

(74) *Attorney, Agent, or Firm* — Jackson Walker L.L.P.

(57) ABSTRACT

An information handling system may include a host system including at least one processor and a memory, a management controller configured to provide out-of-band management of the information handling system, and a power supply unit (PSU). The management controller may be configured to: determine a PSU throttle cap (PTC) value for the PSU, wherein the PTC value represents a maximum amount of power to be supplied by the PSU, and wherein the PTC is based at least in part on an inventory of information handling resources of the information handling system and further based at least in part on workload information obtained from an operating system (OS) of the host system; and in response to power utilization of the information handling system equaling or exceeding the PTC value, cause the information handling system to be throttled to reduce the power utilization.

18 Claims, 2 Drawing Sheets

FRAMEWORK FOR MANAGING PSU MAXIMUM POWER CONSUMPTION THRESHOLD VIA MANAGEMENT CONTROLLER

TECHNICAL FIELD

The present disclosure relates in general to information handling systems, and more particularly to power consumption management techniques for power supply units (PSUs).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may consume a large amount of power in operation. To mitigate problems caused by this, a user-defined current cap policy may be used to specify a limit for an information handling system's maximum input current. For example, in non-redundant mode (i.e., the power grid or input line is not redundant), the user may specify a limit on the overall system input current. In grid-redundant mode, the user may specify per-grid current limits, which can be different for each grid. This feature has the benefit of setting current limit for PSU grids.

The current cap policy may be implemented with circuit breakers or current sensors, which help to protect against the high input current spikes that can occur when the input voltage sags. This policy limits not only actual input current but also the input current derived from output power. The current cap policy is based on PSU input current, and so PSU output power may be converted into input current and the user-specified current limit.

Presently, in instances where the system's power consumption surpasses the capacity of the PSU, the system may experience an abrupt shutdown. This can lead to significant periods of downtime. Currently, there is no existing solution to regulate the over-power usage of the server PSU and prevent abrupt server shutdowns.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with maximum power consumption limits may be reduced or eliminated.

In accordance with embodiments of the present disclosure, an information handling system may include a host system including at least one processor and a memory, a management controller configured to provide out-of-band management of the information handling system, and a power supply unit (PSU). The management controller may be configured to: determine a PSU throttle cap (PTC) value for the PSU, wherein the PTC value represents a maximum amount of power to be supplied by the PSU, and wherein the PTC is based at least in part on an inventory of information handling resources of the information handling system and further based at least in part on workload information obtained from an operating system (OS) of the host system; and in response to power utilization of the information handling system equaling or exceeding the PTC value, cause the information handling system to be throttled to reduce the power utilization.

In accordance with these and other embodiments of the present disclosure, a method may include, in an information handling system that includes a host system including at least one processor and a memory, a management controller configured to provide out-of-band management of the information handling system, and a power supply unit (PSU): the management controller determining a PSU throttle cap (PTC) value for the PSU, wherein the PTC value represents a maximum amount of power to be supplied by the PSU, and wherein the PTC is based at least in part on an inventory of information handling resources of the information handling system and further based at least in part on workload information obtained from an operating system (OS) of the host system; and in response to power utilization of the information handling system equaling or exceeding the PTC value, the management controller causing the information handling system to be throttled to reduce the power utilization.

In accordance with these and other embodiments of the present disclosure, an article of manufacture may include a non-transitory, computer-readable medium having computer-executable instructions thereon that are executable by a management controller of an information handling system that includes a host system including at least one processor and a memory, a management controller configured to provide out-of-band management of the information handling system, and a power supply unit (PSU), the instructions being executable for: determining a PSU throttle cap (PTC) value for the PSU, wherein the PTC value represents a maximum amount of power to be supplied by the PSU, and wherein the PTC is based at least in part on an inventory of information handling resources of the information handling system and further based at least in part on workload information obtained from an operating system (OS) of the host system; and in response to power utilization of the information handling system equaling or exceeding the PTC value, causing the information handling system to be throttled to reduce the power utilization.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
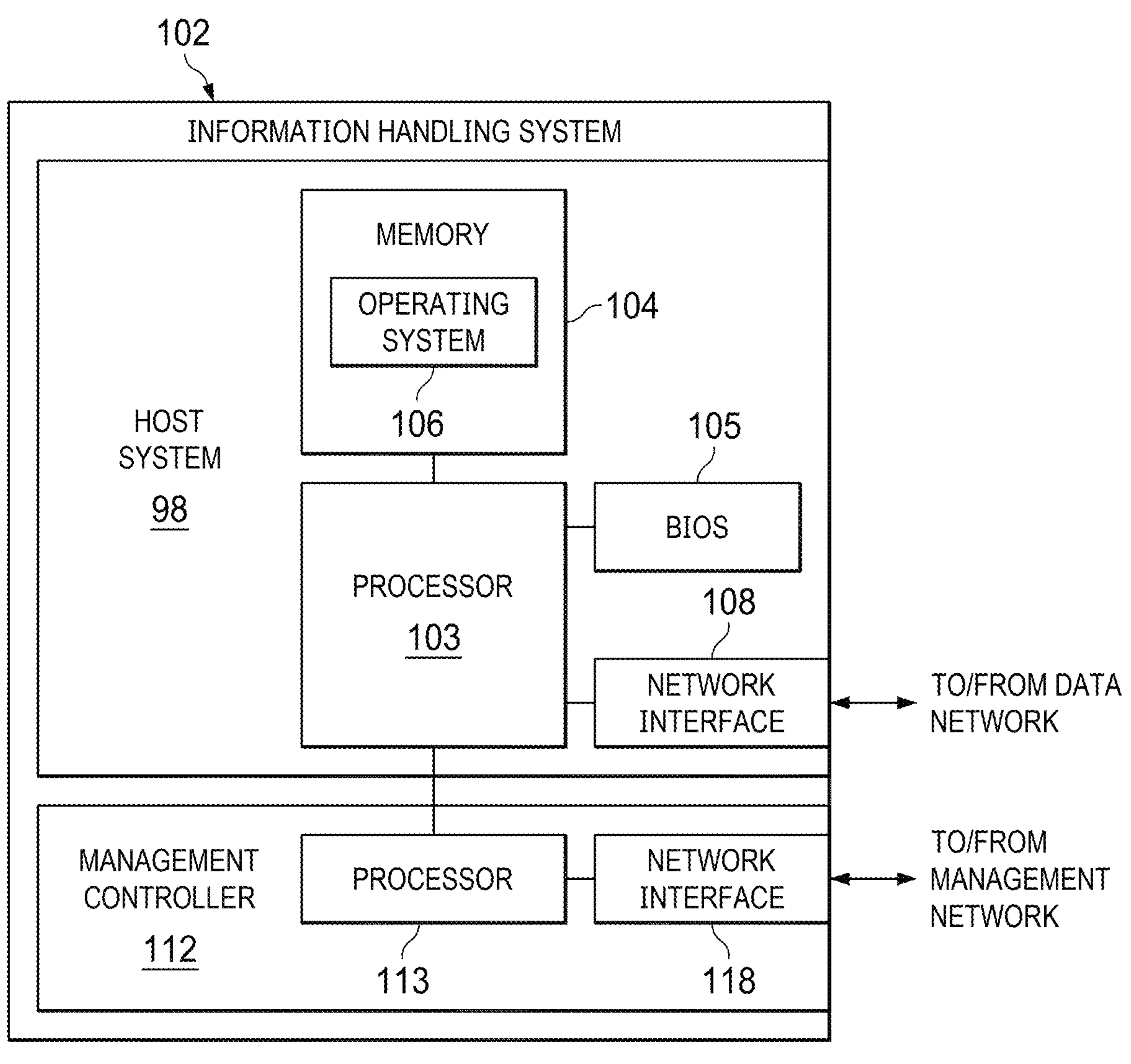
FIG. 1 illustrates a block diagram of an example information handling system, in accordance with embodiments of the present disclosure.
Figure 2:
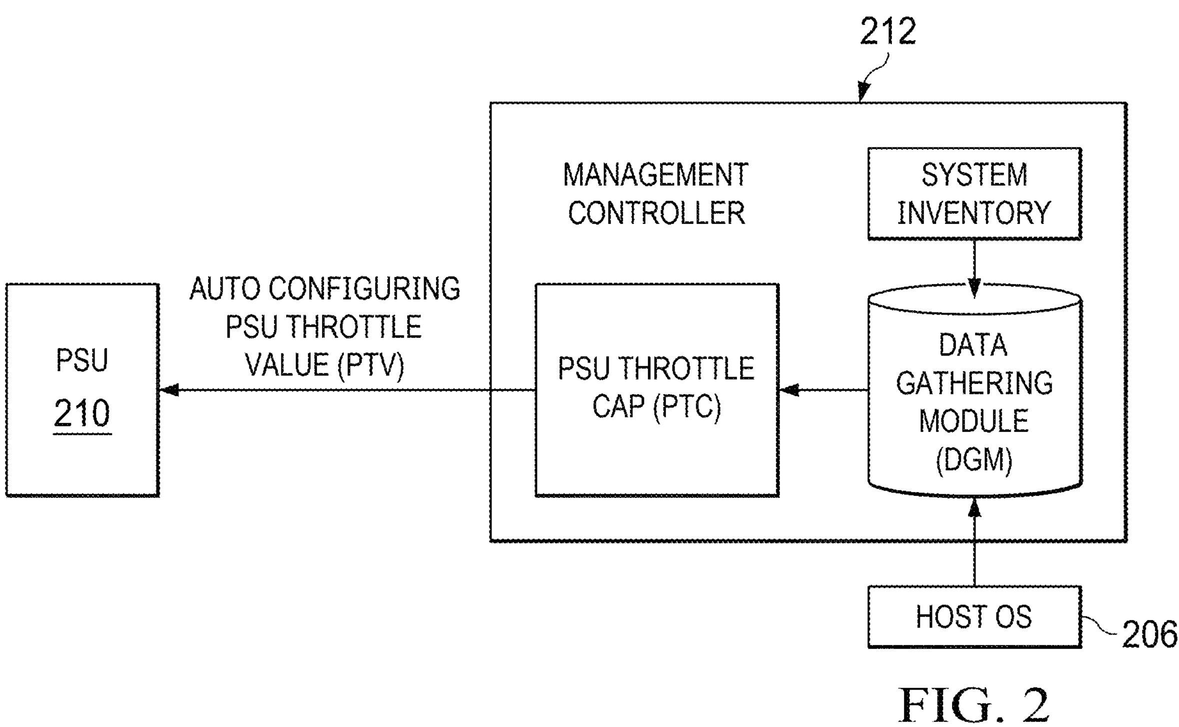
FIG. 2 illustrates a block diagram of another example information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide an automated solution to regulate the power consumption of PSUs and mitigate the risk of abrupt shutdowns of information handling systems.

FIG. 2 illustrates an example architecture. A PSU throttle cap (PTC) module may be implemented within management controller 212. The PTC module may dynamically analyze PSU 210 and the components that it supports, any power redundancy configurations, and workload data to derive a personalized PSU throttle value (PTV) that is specific to each information handling system, tailored to individual configurations and workload demands.

A data gathering module (DGM) of management controller 212 may receive information about the system inventory from management controller 212, as well as workload information from host OS 206, which may be used in determining the PTV. To communicate with host OS 206, the DGM may leverage existing OS passthrough channels such as a USB-NIC and/or various other proprietary channels specific to a given type of management controller. For example, these channels may be used to allow the DGM to retrieve information about the usage of CPU, memory, network, and other resources by host OS 206.

Usage information for each of the OS hardware resources may be accessed in various ways. For example, for obtaining power usage information for the CPU and memory, a power thermal utility tool may be installed on host OS 206. The power thermal utility tool may provide CPU and memory power usage information while applying different workloads to obtain a representative sample of likely power usage patterns.

In some embodiments, the PTV may be dynamically adjusted in real time to accommodate changing workload demands and PSU redundancy settings, in order to manage the PSU's maximum consumption threshold from the management controller by leveraging internal communication channels.

The PTV represents the maximum threshold that the PSU is allowed to supply. Upon reaching the PTV limit, circuit breaker sensors may be triggered, preventing further increases in power input. For example, when such circuit breakers are triggered, PSU 210 may communicate with management controller 212 and/or host OS 206 to cause the system to throttle the processor speed and/or take other steps to reduce power consumption. The dynamic PTV value is continuously adjusted in response to real-time workload demands and PSU availability and redundancy settings.

Utilizing internal channels like racadm, the PTC module may autonomously configure PSU 210 to align with the designated PTV, preventing overpower situations. An iterative process for adjusting the PTV based on ongoing monitoring effectively safeguards against sudden shutdowns. Below are some sample racadm commands that may be used by the PTC module to configure the PTV, in one implementation:

"racadm set system.ServerPwr.SystemCurrentCapSetting Enabled"->Enable System Current Cap "racadm set system.ServerPwr.SystemCurrentCapSetting Disabled"->Disable System Current Cap "racadm set system.serverpwr"->Get system server power In one implementation, the PTV may be selected from a range of possible values extending from a $P_{min}$ value to a $P_{max}$ value, where $$P_{max} = 800 \text{ Watts} * 1.2 = 960 \text{ Watts}$$

$$P_{min} = 960 \text{ Watts} * 95\% = 912 \text{ Watts}$$

The PSU stretch factor is the amount by which the PSU is able to exceed its rated wattage (e.g., for at least a brief time duration).

For example, a particular 800 Watt PSU might have a stretch factor of 1.2 (i.e., it is able to supply 20% more than its rated power for at least a brief time duration). It may also have an efficiency of 95%. These numbers would lead to the following values:

$$P_{max} = (PSU \text{ rated wattage}) * (PSU \text{ stretch factor})$$

$$P_{min} = P_{max} * (PSU \text{ efficiency})$$

The PTV for this PSU may then be selected from that range of values, based on the other information collected by the DGM.

The PTV may also take into account that multiple PSUs may be present, in either a redundant mode or a non-redundant mode. For example, suppose a system includes two of the 800 Watt PSUs discussed above.

In redundant mode, only one PSU will be actively supplying power at any given time. Accordingly, the PTV will be the range calculated above, 912-960 Watts.

In non-redundant mode, both PSUs may be actively supplying power at the same time. Accordingly, the numbers above may be doubled for a PTV in the range of 1,824-1,920 Watts. If one PSU fails, then the system is effectively reduced to one non-redundant 800 Watt PSU, and so the PTV may be changed to the range of 912-960 Watts.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

a host system including at least one processor and a memory;

a management controller configured to provide out-of-band management of the information handling system; and a power supply unit (PSU);

wherein the management controller is configured to:

determine a PSU throttle cap (PTC) value for the PSU, wherein the PTC value represents a maximum amount of power to be supplied by the PSU, and wherein the PTC is based at least in part on an inventory of information handling resources of the information handling system and further based at least in part on workload information obtained from an operating system (OS) of the host system; and in response to power utilization of the information handling system equaling or exceeding the PTC value, cause the information handling system to be throttled to reduce the power utilization.

2. The information handling system of claim 1, wherein the management controller is a baseboard management controller (BMC).

3. The information handling system of claim 1, wherein the PTC value is determined not to exceed a $P_{max}$ value, wherein the $P_{max}$ value equals a rated power of the PSU times a stretch factor.

4. The information handling system of claim 3, wherein the PTC value is determined not to fall below a $P_{min}$ value, wherein the $P_{min}$ value equals the $P_{max}$ value times an efficiency of the PSU.

5. The information handling system of claim 1, wherein causing the information handling system to be throttled comprises causing the at least one processor to operate at a reduced frequency.

6. The information handling system of claim 1, wherein the PSU comprises a plurality of PSUs configured to operate in a redundant mode.

7. A method comprising, in an information handling system that includes a host system including at least one processor and a memory, a management controller configured to provide out-of-band management of the information handling system, and a power supply unit (PSU):

the management controller determining a PSU throttle cap (PTC) value for the PSU, wherein the PTC value represents a maximum amount of power to be supplied by the PSU, and wherein the PTC is based at least in part on an inventory of information handling resources of the information handling system and further based at least in part on workload information obtained from an operating system (OS) of the host system; and in response to power utilization of the information handling system equaling or exceeding the PTC value, the management controller causing the information handling system to be throttled to reduce the power utilization.

8. The method of claim 7, wherein the management controller is a baseboard management controller (BMC).

9. The method of claim 7, wherein the PTC value is determined not to exceed a $P_{max}$ value, wherein the $P_{max}$ value equals a rated power of the PSU times a stretch factor.

10. The method of claim 9, wherein the PTC value is determined not to fall below a $P_{min}$ value, wherein the $P_{min}$ value equals the $P_{max}$ value times an efficiency of the PSU.

11. The method of claim 7, wherein causing the information handling system to be throttled comprises causing the at least one processor to operate at a reduced frequency.

12. The method of claim 7, wherein the PSU comprises a plurality of PSUs configured to operate in a redundant mode.

13. An article of manufacture comprising a non-transitory, computer-readable medium having computer-executable instructions thereon that are executable by a management controller of an information handling system that includes a host system including at least one processor and a memory, a management controller configured to provide out-of-band management of the information handling system, and a power supply unit (PSU), the instructions being executable for:

determining a PSU throttle cap (PTC) value for the PSU, wherein the PTC value represents a maximum amount of power to be supplied by the PSU, and wherein the PTC is based at least in part on an inventory of information handling resources of the information handling system and further based at least in part on workload information obtained from an operating system (OS) of the host system; and in response to power utilization of the information handling system equaling or exceeding the PTC value, causing the information handling system to be throttled to reduce the power utilization.

14. The article of manufacture of claim 13, wherein the management controller is a baseboard management controller (BMC).

15. The article of manufacture of claim 13, wherein the PTC value is determined not to exceed a $P_{max}$ value, wherein the $P_{max}$ value equals a rated power of the PSU times a stretch factor.

16. The article of manufacture of claim 15, wherein the PTC value is determined not to fall below a $P_{min}$ value, wherein the $P_{min}$ value equals the $P_{max}$ value times an efficiency of the PSU.

17. The article of manufacture of claim 13, wherein causing the information handling system to be throttled comprises causing the at least one processor to operate at a reduced frequency.

18. The article of manufacture of claim 13, wherein the PSU comprises a plurality of PSUs configured to operate in a redundant mode.

* * * * *